(12) United States Patent
Arnce

(10) Patent No.: US 7,540,516 B2
(45) Date of Patent: Jun. 2, 2009

(54) MACHINE FOR A FLOATING HANDLEBAR SYSTEM

(76) Inventor: John Arnce, 3104 Sun Up Ct., Bonita, CA (US) 91902

( * ) Notice: Subject to any disclaimer, the term of this patent is extended or adjusted under 35 U.S.C. 154(b) by 76 days.

(21) Appl. No.: 11/904,800

(22) Filed: Sep. 28, 2007

(65) Prior Publication Data

US 2009/0085322 A1   Apr. 2, 2009

(51) Int. Cl.
*B62K 21/00* (2006.01)
(52) U.S. Cl. ............... 280/276; 280/263; 280/283; 74/551.2
(58) Field of Classification Search ........... 280/263, 280/283, 276; 74/551.2
See application file for complete search history.

(56) References Cited

U.S. PATENT DOCUMENTS

| 841,450 | A | | 1/1907 | Rosen | |
|---|---|---|---|---|---|
| 1,156,420 | A | | 10/1915 | MacLean | |
| 5,163,697 | A | * | 11/1992 | Kastan | 280/276 |
| 5,301,973 | A | * | 4/1994 | Truchinski | 280/276 |
| 5,377,557 | A | | 1/1995 | Nastrucci | |
| 5,494,302 | A | | 2/1996 | Farris et al. | |
| 5,622,132 | A | | 4/1997 | Mardikian | |
| 5,725,226 | A | * | 3/1998 | Cabrerizo-Pariente | 280/276 |
| 6,017,047 | A | * | 1/2000 | Hoose | 280/276 |
| 6,802,519 | B2 | * | 10/2004 | Morgan et al. | 280/272 |
| 6,953,201 | B1 | | 10/2005 | VanDeMortel | |
| 6,988,740 | B2 | | 1/2006 | Bobrovniczky | |
| 7,178,820 | B2 | * | 2/2007 | Terblanche | 280/276 |
| 7,185,905 | B2 | | 3/2007 | Czysz | |
| 7,207,585 | B2 | | 4/2007 | Czysz | |
| 2005/0127636 | A1 | * | 6/2005 | Czysz | 280/276 |
| 2005/0236802 | A1 | * | 10/2005 | Bobrovniczky | 280/276 |
| 2005/0247160 | A1 | | 11/2005 | Ha et al. | |
| 2006/0038377 | A1 | * | 2/2006 | Horiuchi | 280/276 |
| 2006/0049610 | A1 | | 3/2006 | Ignacio | |
| 2006/0138744 | A1 | * | 6/2006 | Namazue et al. | 280/276 |
| 2006/0192363 | A1 | * | 8/2006 | Liao | 280/276 |
| 2006/0196713 | A1 | * | 9/2006 | Taniguchi et al. | 180/227 |
| 2006/0279059 | A1 | * | 12/2006 | Czysz | 280/276 |
| 2007/0262555 | A1 | * | 11/2007 | Fox | 280/276 |
| 2008/0246249 | A1 | * | 10/2008 | Pokrywka | 280/283 |
| 2008/0315550 | A1 | * | 12/2008 | Parker | 280/276 |

OTHER PUBLICATIONS

1990 Japanese Patent No. 2-45287.

* cited by examiner

*Primary Examiner*—Paul N Dickson
*Assistant Examiner*—Tashiana Adams
(74) *Attorney, Agent, or Firm*—McGahey & McGahey, PLC; Harry V. McGahey, Esq.

(57) ABSTRACT

A apparatus for a shock absorbing handlebar steering mechanism for vehicles.

20 Claims, 3 Drawing Sheets

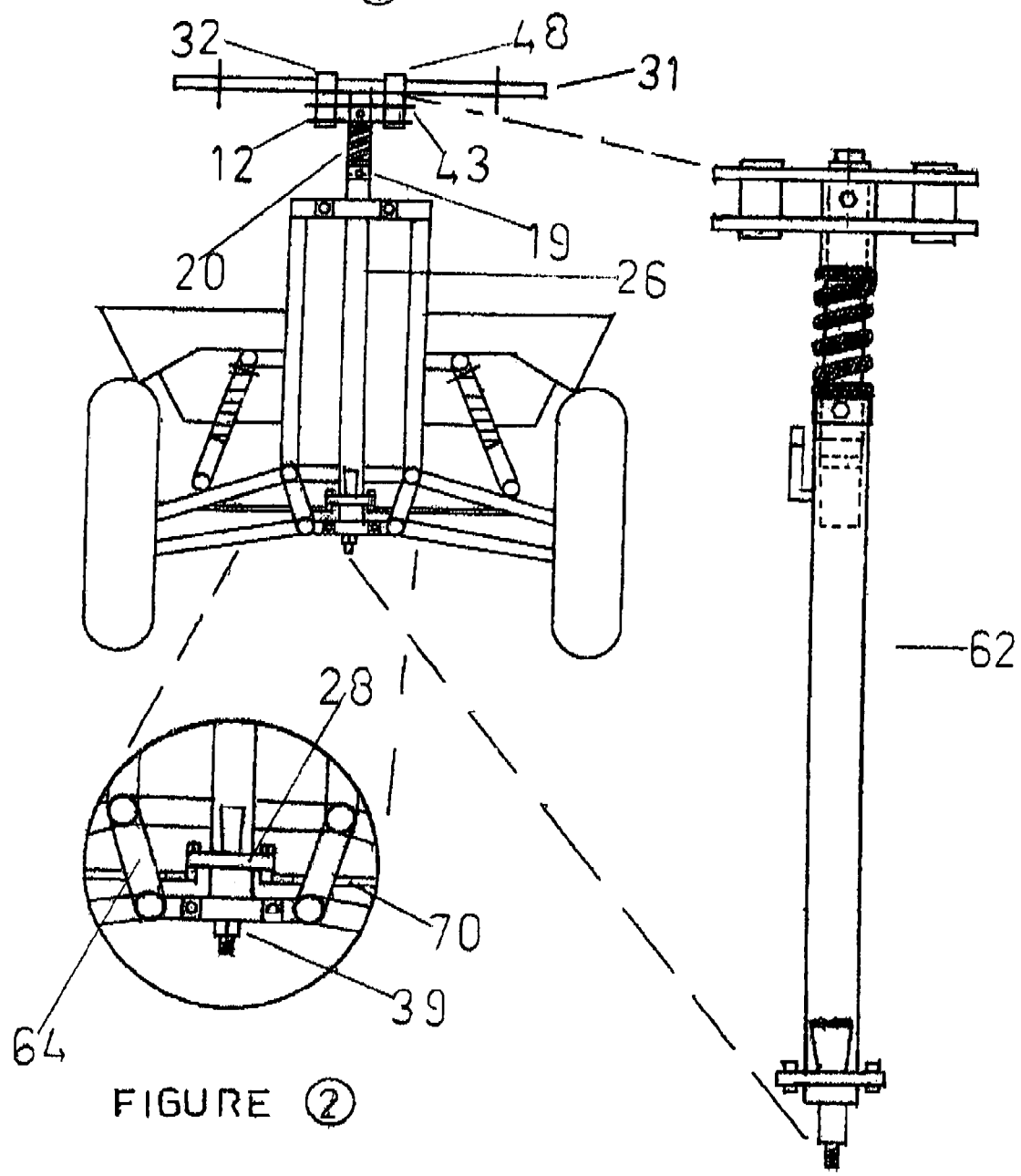

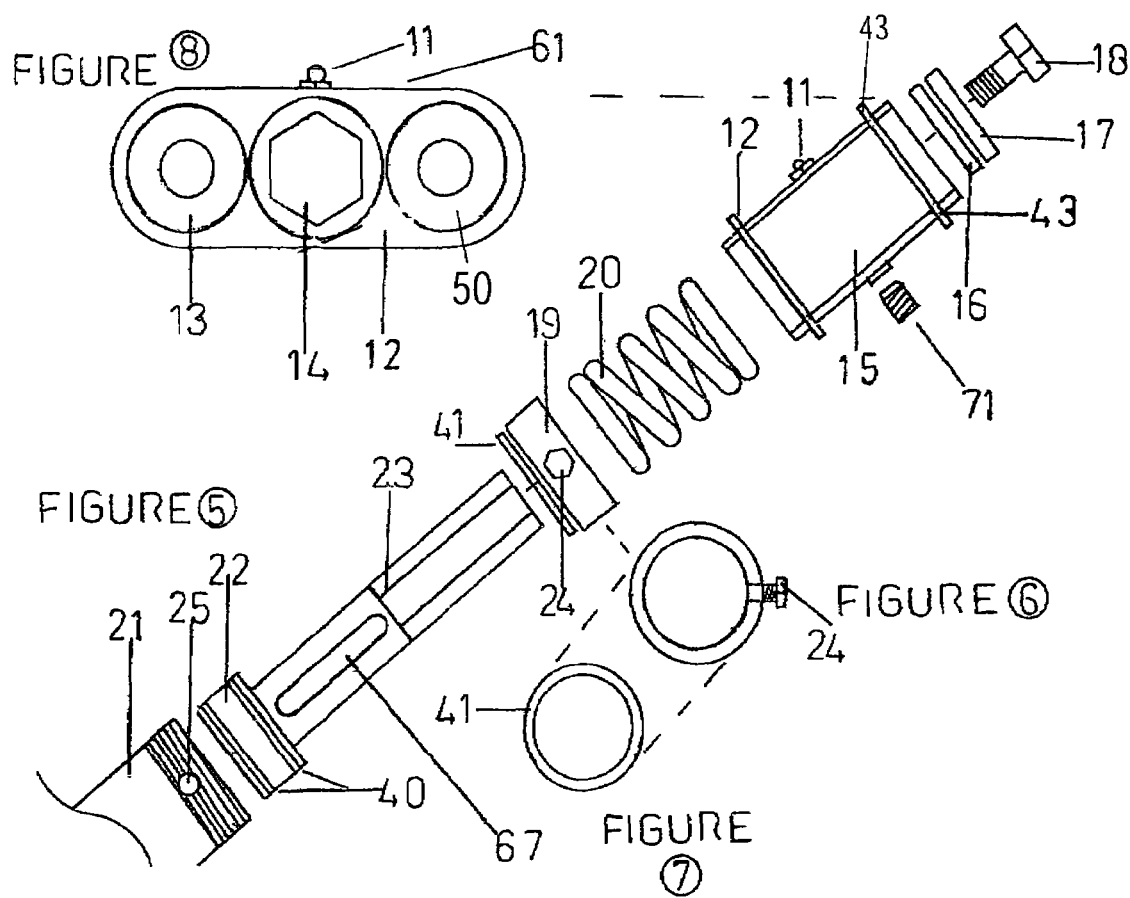

MACHINE FOR A FLOATING HANDLEBAR SYSTEM

CROSS REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

DESCRIPTION OF ATTACHED APPENDIX

Not Applicable

BACKGROUND OF THE INVENTION

This invention relates generally to the field of steering systems and more specifically to a machine for a floating handlebar system.

BACKGROUND

Historically steering mechanism for ATV's and Quads have been direct connection devices which did not allow shocks to the front wheels to be absorbed before being transmitted to the arms of the operator through the handle bars of the vehicle.

PRIOR RELEVANT ART

Prior relevant art includes U.S. Patent Application Nos. U.S. 2006/0049610 A1 (Ignacio), US 2005/0247160 A1 (Ha et. al), and U.S. Pat. Nos. 7,207,585 B2 (Czysz), 7,185,905 B2, 6,988,740 B2 (Bobrovniczky), 6,953,201 B1 (VanDeMortel), 5,622,132 (Markikian), 5,494,302 (Farris et. al.), 5,377,557 (Nastrucci), and 1,156,420 (MacLean).

None of the prior technology is as effective at absorbing shock from the front wheels before it can reach the operator through the handle bars as the subject invention. A recoil spring on the steering stem and a hydraulic piston system which can be used with or without the recoil spring, or in combination with it, allows the handle bars to move up and down upon impacts to the front wheels, thereby reducing the shock traveling to the arms and through-out the body, reducing fatigue and injury on rough terrain or from a front impact.

BRIEF SUMMARY OF THE INVENTION

This is an invention which allows an All Terrain Vehicle (ATV), Quadcycle, Snowmobile, Quad 4-Wheeler, 4 Wheel Sport Quad Cycle, Jet Ski, or similar vehicle, to have a shock absorbing, floating handlebar system. It is an invention comprised of shock absorbing or free floating handle bars. A recoil spring on the steering stem and a hydraulic piston system which can be used with or without the recoil spring, or in combination with it, allows the handle bars to move up and down upon impacts to the front wheels, thereby reducing the shock traveling to the arms and through-out the body, reducing fatigue and injury on rough terrain or from a front impact.

The primary object of the invention is to provide a safer and more comfortable handlebar for recreational vehicles and ATV's so as to allow a smoother and a safer ride on rough or bumpy terrain.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a machine for a floating handlebar system comprising: A Center Steering Assembly (62) comprised of a Handlebar Slide Mount (15), a Lower Handlebar Mount Support Plate (12) near the lower end of the Handle Bar Slide Mount (15), said Lower Handlebar Mount Support Plate (12) affixed around the lower circumference of the Handle Bar Slide Mount (15), an Upper Handlebar Mount Support Plate (43) near the upper end of the Handle Bar Slide Mount (15), said Upper Handlebar Mount Support Plate (43) affixed around the upper circumference of the Handle Bar Slide Mount (15), a Progressive Spring (20) inserted underneath the Middle Tube (14) of the Center Steering Assembly (61), a Cylinder Shaft Mount Orifice (14) in the center of the Handlebar Mount Assembly (61), a Lock Collar Cylinder Stop (19) seated onto the upper end of a Cylinder Shaft (23), a Cylinder Piston (22) affixed to the lower end of the Cylinder Shaft (23), Piston Rubber Seals (44) around the circumference of the Cylinder Piston (22), the Cylinder Piston (22) inserted into a Cylinder (21) comprising the Main Shaft Stem (26). The Cylinder (21) is filled with hydraulic fluid which feeds in and out through a small orifice into a Hydraulic Fluid Discharge Reservoir Means (68) as the Cylinder Piston (22) moves up and down inside the Cylinder (21). In the preferred embodiment, during operation of the system, the Handle Bar Slide Mount (15) rides up and down the hexagonal Cylinder Shaft (23) unless the Cylinder Shaft (23) is locked to the Handle Bar Slide Mount (15) by the Bar Slide Lock Bolt (71). There are two ways to utilize the floating handlebar system. If the Bar Slide Lock Bolt (71) is left loose so it does not secure the Cylinder Shaft (23) inside the Handle Bar Slide Mount (15), then shocks and vibration are dampened and absorbed by both the Piston (22) in contact with the hydraulic fluid inside the Cylinder (21) and the Spring (20). If the Bar Slide Lock Bolt (71) is tightened down onto the Cylinder Shaft (23) through the access orifice in the side of the Handle Bar Slide Mount (15), then the Spring (20) is not used and the system absorbs shocks and dampens vibration only from the movement of the Piston (22) in contact with the hydraulic fluid inside the Cylinder (21). A Set Screw Orifice (25) to accept a Set Screw (24) from the Lock Collar Cylinder Stop (19) is present to prevent the Cylinder Shaft (23) from pulling out of the Cylinder (21), a mounting bolt (18) inserted through the upper end of the Handle Bar Slide Mount (15), the Progressive Spring (20) placed onto the upper end of the Lock Collar Cylinder Stop (19), a Steering Bracket (28) around the circumference of the lower end of the Main Shaft Stem (26), a Mounting Hardware Nut and Washer (39) inserted into the lower end of the narrowed Shaft Mounting Surface (29) of the Main Shaft Stem (26), the Handlebar Mount Assembly (61) comprised of a hollow Left Short Tube (44) to the left of the Cylinder Shaft Mount Orifice (14) supported by the Lower Handle Bar Mount Support Plate (12) near the bottom and the Upper Handle Bar Mount Support Plate (43) near the top, a Left Mounting Bolt (34) inserted through the Left Handle Bar Mounting Orifice (13), the Left Top Handle Bar Clamp (32) and the Bottom Handle Bar Clamp (33) and then into the upper end of the hollow Left Short Tube (44), and the left Mounting Bolt (34) anchored at the bottom of the Left Short Tube (44) by a Left Mounting Nut (37). The right side system for anchoring the handlebar on the right side is a mirror image of the anchoring system on the right, comprised of a hollow Right Short Tube (45) on the opposite side of the Main Shaft Stem (26) supported by the Lower Handle Bar Mount Support Plate (12), a Right Mounting Bolt (not shown) inserted into the upper end of the hollow Right Short Tube (45) through the Right Handle Bar Mounting Orifice (50), the Right Top Handle Bar Clamp (48), the Right Bottom Handle Bar Clamp (49) and then into the upper end of the hollow Right Short Tube (45). The Right Short Arm (45) to the right of the Main Shaft Stem (26) is attached to the Cylinder Shaft Mount Orifice Tube (14) and supported by the Upper Handle Bar Mount Support (43) and the Lower Handle Bar Mount Support (12). The Center Steering Assembly (62) having the Handlebar Mount Assembly (61) attached to the upper end of the Center Steering Assembly (62) at the Cylinder Shaft Mount Orifice (14), the Main Shaft Stem (26) then being attached by a strong, secure attachment means to the frame of the vehicle. A Handlebar Means (31) is inserted between the Left Top Handle Bar Clamp (32) and Left Bottom Handle Bar Clamp (33) on the left, with an identical, mirror image anchoring system on the right using a Right Top Handlebar Clamp (48) and a Right Bottom Handlebar Clamp (49). The Floating Handlebar system actually steers the vehicle it is attached to via a Mounting Hardware Nut and Washer means (39) at the base of the Main Shaft Stem (26), where the steering rod means (70) of the vehicle are attached at the point of insertion of the Mounting Hardware Nut (39) by a Steering Bracket (28) or some other Steering System attachment means.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 1 is an elevational view of the invention installed on a typical recreational vehicle.

FIG. 2 is a close up elevational view of the invention connected to the steering means on a typical recreational vehicle.

FIG. 3 is an elevational view of the Main Shaft Stem/Center Steering Assembly of the invention.

FIG. 5 is an exploded view of the Progressive Spring assembly and related parts in the preferred embodiment of the invention.

FIG. 6 is a plan view of the Lock Collar Cylinder Stop of the invention from above.

FIG. 7 is a plan view of the Rubber "O" Ring Seal installed into the outer perimeter of the Lock Collar Cylinder Strap portion of the invention from above.

FIG. 8 is a plan view of the Handle Bar Mount Assembly portion of the invention from above.

DETAILED DESCRIPTION OF THE PREFERRED EMBODIMENTS

Figure 4:
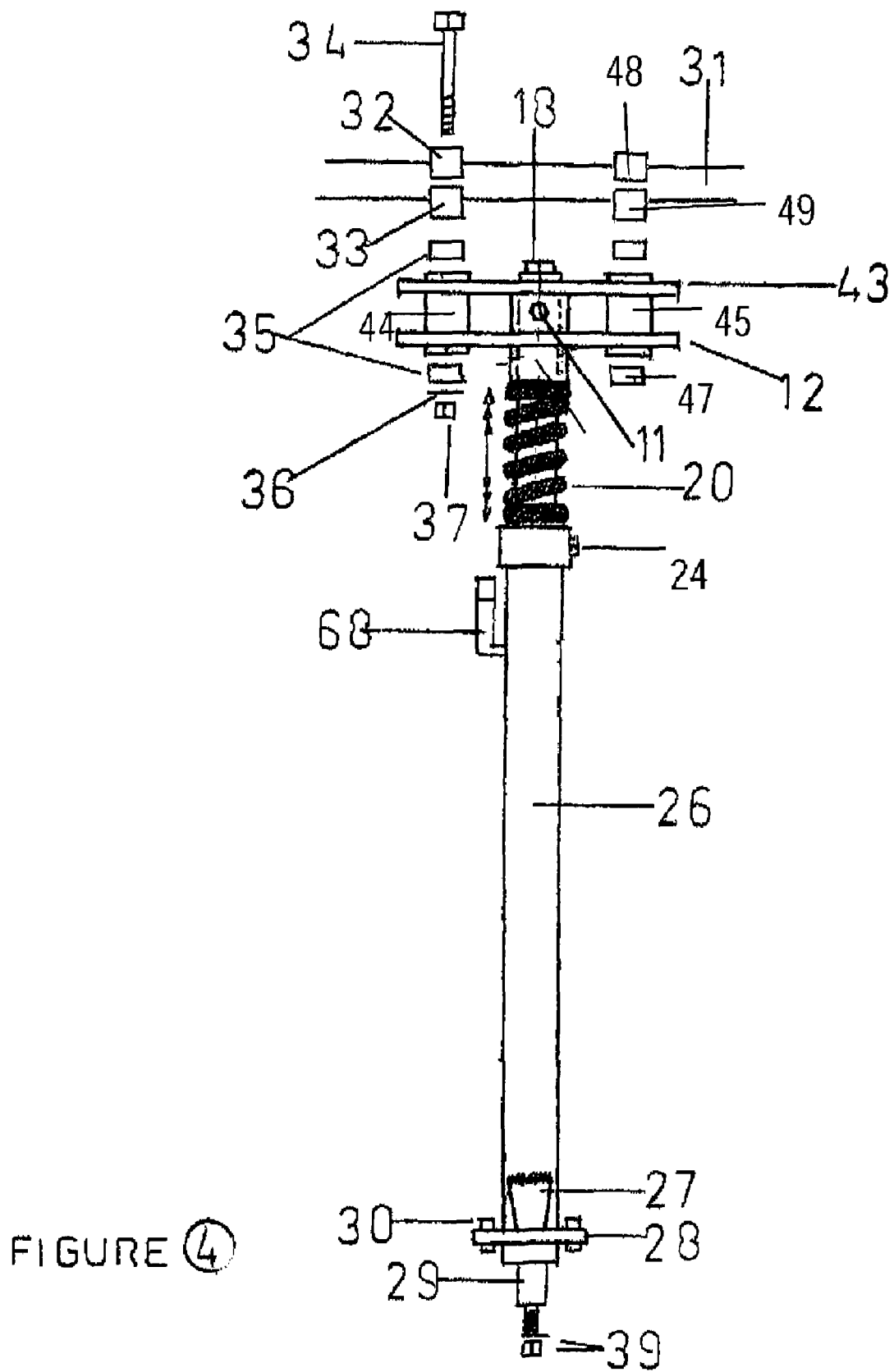
FIG. 4 is an exploded view of the Main Shaft Stem/Center Steering Assembly of the invention.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

FIG. 1 illustrates an elevational view of the preferred embodiment of the invention installed on a typical ATV-Quad showing the placement of the floating shock handlebar system and the point of attachment of the steering Rod Ends to the steering means of the vehicle. A Lower Handlebar Mount Support Plate (12) and an Upper Handlebar Mount Support Plate (43) hold the Handle Bars of the vehicle in place over the progressive spring (20) which is connected to the. Main Shaft Stem (26). In the preferred embodiment, the Handle Bars of the ATV-Quad (31) are attached to the vehicle by inserting a Handlebar (31) between the Left Top Handle Bar Clamp (32) and a Left Bottom Handle Bar Clamp (33) [Shown in FIG. 4] on the left, and the Right Top Handlebar Clamp (48) and a similar Right Bottom Handlebar Clamp on the right. Also the Main Shaft Stem (26) with the Progressive Spring (20) is also visible.

FIG. 2 is an close up elevational view of the invention connected to the steering means. At the bottom of FIG. 1 can be seen the Steering Bracket means (28) around the circumference of the lower end of the Main Shaft Stem (26) [Shown in FIG. 1]. Also can be seen the Mounting Hardware Nut (39) inserted into the lower end of the narrowed Shaft Mounting Surface (29) [Shown in FIG. 4] of the Main Shaft Stem (26). The steering means (64) of the vehicle can be seen attached at the point of insertion of the Mounting Hardware Nut (39) by a Hardware Nut and Washer means at the base of the Main Shaft Stem (26) [Shown in FIG. 1]. Typical Steering Rods (70) can also be seen in FIG. 2.

FIG. 3 is an elevational view of the entire Center Steering Assembly denoted (62) without the Handle Bars or Handle Bar Clamps installed.

FIG. 4 is an exploded view of the preferred embodiment of the Steering Assembly showing a Main Shaft Stem (26) without the Handle Bars installed. The Main Shaft Stem (26) is comprised of a Handlebar Slide Mount (15) [Shown in FIG. 5], a Lower Handlebar Mount Support Plate (12) near the lower end of the Handle Bar Slide Mount (15), the Lower Handlebar Mount Support Plate (12) being affixed around the lower circumference of the Handle Bar Slide Mount (15). An Upper Handlebar Mount Support Plate (43) near the upper end of the Handle Bar Slide Mount (15), the Upper Handlebar Mount Support Plate (43) being affixed around the upper circumference of the Handle Bar Slide Mount (15) can be seen. A Spring (20) is inserted below the Handlebar Mount Support Plate (12) and the Lock Collar Cylinder Stop (19) seated onto the upper end of the Main Shaft Stem (26). In the preferred embodiment, a Progressive Spring is used. The vertical arrows next to the Spring (20) indicate the Movement Area for the Cylinder Piston (22) [Shown in FIG. 5]. The Set Screw (25) [Shown in FIG. 5] in the Lock Collar Cylinder Stop (19) prevents the Cylinder Shaft [(23) on FIG. 5] from pulling out of the Cylinder [(21) on FIG. 5]. This Cylinder (21) is filled with hydraulic fluid which feeds in and out through a small orifice into a Hydraulic Fluid Discharge Reservoir Means (68) as the Cylinder Piston (22) (Shown in FIG. 5) moves up and down inside the Cylinder (21). The Hydraulic Fluid Discharge Reservoir Means (68) has a small orifice to restrict the flow and uptake of hydraulic fluid in and out of the Cylinder (21) [Shown in FIG. 5] to dampen shocks and vibration as the Piston (22) moves up and down. The Steering Bracket (28) around the circumference of the lower end of the Main Shaft Stem (26), the Mounting Hardware Nut (39) inserted into the lower end of the narrowed Shaft Mounting Surface (29) of the Main Shaft Stem (26) can also be seen. Also FIG. 4 shows in detail the Handlebar Mount Assembly comprised of a hollow Left Short Tube to the left of the Cylinder Shaft Mounting Orifice (14) supported by the Lower Handle Bar Mount Support Plate (12) near the bottom and the Upper Handle Bar Mount Support Plate (43) near the top, a Left Mounting Bolt (34) inserted through a Left Handle Bar Mounting Orifice (13), the Left Top Handle Bar Clamp (32) and the Bottom Handle Bar Clamp (33), and then into the upper end of the hollow Left Short Tube (44), the left Mounting Bolt (34) anchored at the bottom of the Left Short Arm (44) by a Left Mounting Nut (37) over a Left Mounting Washer. An identical mirror image system mounts the right side of the handlebars. A hollow Right Short Tube (45) on the right side of the Main Shaft Stem (26) is supported by the Lower Handle Bar Mount Support Plate (12). A Right Mounting Bolt (not shown) is inserted into the Right Top Handle Bar Clamp (48) and then through the Right Bottom Handle Bar Clamp (49) and then into the upper end of the hollow Right Short Tube (45). In the preferred embodiment, there are Mounting Spacers (35) at the top and bottom of each side of the Handlebar Mount Assembly Left Short Tube (44) and Right Short Tube (45), and Mounting Washers (36) between the Left Mounting Nut (37) and the Right Mounting Nut (47). The entire Handle Bar Mount Assembly is comprised of the Center Steering Assembly (62) (Shown in FIG. 3) with the Handlebar Mount Assembly (Shown in FIG. 8) attached to the upper end of the Center Steering Assembly (62) at the Cylinder Shaft Mount Orifice (Shown as (14) in FIG. 8). In the preferred embodiment, the Main Shaft Stem (26) is attached by a strong, secure attachment means to the frame of the vehicle. The location where a Handlebar Means (31) can be inserted between the Left Top Handle Bar Clamp (32) and Left Bottom Handle Bar Clamp (33) on the left and the Right Top Handlebar Clamp (48) and the Right Bottom Handlebar Clamp (49) is also shown. At the bottom of the figure, the Mounting Hardware Nut and Washer means (39) at the base of the Main Shaft Stem (26) at point (30) is where the steering means (ie. the Steering Rod Mount Bushings in the preferred embodiment) of the vehicle are attached at the point of insertion of the Mounting Hardware Nut (39) by an attachment means. A Steering Bracket Support Gusset (27) is attached to one side of the vertical longitudinal axis of the Main Shaft Stem (26) to give strength to it in the preferred embodiment. Also in the preferred embodiment, The Steering Bracket (28) has a Steering Rod Mount Bushing (30) on each side to attach to the Steering Arms of the vehicle the machine is installed upon.

FIG. 5 is an exploded view of the Spring assembly and related parts in the preferred embodiment of the invention. This is a close up showing the upper part of the Center Steering Assembly in FIG. 4 comprised of a Handlebar Slide Mount (15), a Lower Handlebar Mount Support Plate (12) near the lower end of the Handle Bar Slide Mount (15), the Lower Handlebar Mount Support Plate (12) affixed around the lower circumference of the Handle Bar Slide Mount (15), an Upper Handlebar Mount Support Plate (43) near the upper end of the Handle Bar Slide Mount (15), said Upper Handlebar Mount Support Plate (43) affixed around the upper circumference of the Handle Bar Slide Mount (15). In the preferred embodiment, a Progressive Spring (20) inserted up inside the Lower Handlebar Mount Assembly (12), a Lock Collar Cylinder Stop (19) is seated onto the upper end of a Cylinder Shaft (23), a Cylinder Piston (22) is affixed to the lower end of the Cylinder Shaft (23), Piston Rubber Seals (40) surround the circumference of the Cylinder Piston (12), the Cylinder Piston (22) inserted into a Cylinder (21) which comprises the Main Shaft Stem (26), and a Set Screw Orifice (25) is present to accept a Set Screw (24) from the Lock Collar Cylinder Stop (19) to prevent the Cylinder Shaft (23) from pulling out of the Cylinder (21). The Cylinder (21) is filled with hydraulic fluid which feeds in and out through a small orifice into a Hydraulic Fluid Discharge Reservoir Means (68) as the Cylinder Piston (22) moves up and down inside the Cylinder (21). In the preferred embodiment, during operation of the system, the Handle Bar Slide Mount (15) rides up and down the hexagonal Cylinder Shaft (23) unless the Cylinder Shaft (23) is locked to the Handle Bar Slide Mount (15) by the Bar Slide Lock Bolt (71). There are two ways to utilize the floating handlebar system. If the Bar Slide Lock Bolt (71) is left loose so it does not secure the Cylinder Shaft (23) inside the Handle Bar Slide Mount (15), then shocks and vibration are dampened and absorbed by both the Piston (22) in contact with the hydraulic fluid inside the Cylinder (21) and the Spring (20). If the Bar Slide Lock Bolt (71) is tightened down onto the Cylinder Shaft (23) through the access orifice in the side of the Handle Bar Slide Mount (15), then the Spring (20) is not used and the system absorbs shocks and dampens vibration only from the movement of the Piston (22) in contact with the hydraulic fluid inside the Cylinder (21). In the preferred embodiment, there is a Guide Pin Slot (67) means located on the Cylinder Shaft (23) which is engaged by the combination Shaft Guide Pin/Set Screw for Lock Collar Shaft (24) to help keep the Cylinder Shaft (23) from rotating during use. A mounting bolt (18) is inserted through the upper end of the Handle Bar Slide Mount (15) and the Progressive Spring (20) is inserted into the upper end of the Cylinder Shaft (23). In the preferred embodiment the Mounting Bolt (18) passes through a Mounting Washer (17) with a Rubber Stop Washer (16) immediately below it prior to insertion into the Handle Bar Slide Mount (15). The preferred embodiment uses a Progressive Spring which increases tension as it compresses, however, a hydraulic spring mechanism or any suspension means could be used in place of a spring. Further, if a spring is used, it could be either metallic or any other suitable material giving sufficient progressive increased tension as it is compressed. In the preferred embodiment, a Spring Boot Cover or Recoil Boot Cover means covers the area where the Handlebar Slide Mount (15) and the Cylinder (21) interface. This Boot Cover may be comprised of rubber, plastic, or other flexible material.

FIG. 6 is a plan view of the Lock Collar Cylinder Stop Set Screw (24) of the invention from above.

FIG. 7 is a plan view of the Rubber "O" Ring Seal (41) installed into the outer perimeter of the Lock Collar Cylinder Shaft portion of the invention from above.

FIG. 8 is a plan view of the Handle Bar Mount Assembly (61) portion of the invention from below. The Handlebar Mount Assembly (61) is attached to the upper portion of the Center Steering Assembly [(62) in FIG. 3]. A Lubrication Inlet (11) can be seen at the top of FIG. 8. Also the Lower Handle Bar Mount Support Plate (12) is visible with the Left and Right Handle Bar Mounting Orifices (13). The Cylinder Shaft Mount Orifice (14) is visible where the Cylinder Shaft

[(23) in FIG. 5] is inserted through it so the Cylinder Shaft [(23) in FIG. 5] can ride vertically up and down being supported by the Spring [(20) in FIG. 5]. In the preferred embodiment, there is a spline on the vertical surface of the Cylinder Shaft (23) which nests into a notch in the Center Steering Assembly (62) at the Cylinder Shaft Mount Orifice (14). This locks the shaft and prevents it from coming lose when using the steering mechanism.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A machine for a floating handlebar system comprising:
   a. a center steering assembly comprised of a handlebar slide mount;
   b. a main shaft stem;
   c. a hollow cylinder inside the main shaft stem;
   d. hydraulic fluid inside the cylinder;
   e. a fluid discharge reservoir means;
   f. the fluid discharge reservoir connected to the hydraulic fluid in the cylinder by a small diameter orifice;
   g. a piston on top of the hydraulic fluid inside the cylinder;
   h. a cylinder shaft;
   i. the cylinder shaft attached to the piston opposite the side of the piston in contact with the hydraulic fluid;
   j. a lock collar cylinder stop;
   k. a spring;
   l. the spring inserted between the handlebar slide mount and the lock collar cylinder stop;
   m. a shaft guide pin means;
   n. the shaft guide pin means inserted laterally through the vertical sidewall of the lock collar cylinder stop;
   o. a bar slide lock bolt which can be tightened down inserted through the vertical side wall of the handlebar slide mount;
   p. a steering bracket attachment means on the handlebar slide mount;
   q. handlebars for the vehicle attached to the steering bracket attachment means;
   r. the center steering assembly comprised of the handle bar slide mount and the main shaft stem attached by a strong, secure attachment at to the frame of the vehicle;
   s. a steering means for the vehicle attached to the center steering assembly.

2. The machine for a floating handlebar system in claim 1 wherein a gases are used in place of hydraulic fluid.

3. The machine for a floating handlebar system in claim 1 wherein a spring is used in place of hydraulic fluid.

4. The machine for a floating handlebar system in claim 1 wherein a progressive spring is used in place of hydraulic fluid.

5. A machine for a floating handlebar system comprising:
   a. a center steering assembly comprised of a handlebar slide mount;
   b. a lower handlebar mount support plate;
   c. the lower handlebar mount support plate surrounding and affixed to the lower circumference of the handle bar slide mount;
   d. an upper handlebar mount support plate;
   e. the upper handlebar mount support plate affixed around the upper circumference of the handle bar slide mount;
   f. a main shaft stem;
   g. a hollow cylinder inside the main shaft stem;
   h. hydraulic fluid inside the cylinder;
   i. a fluid discharge reservoir means;
   j. the fluid discharge reservoir connected to the hydraulic fluid in the cylinder by a small diameter orifice;
   k. a spring inserted inside the handlebar mount support plate;
   l. a cylinder shaft mount orifice in the center of the handlebar mount assembly;
   m. a lock collar cylinder stop seated onto the upper end of a cylinder shaft;
   n. a cylinder piston;
   o. a cylinder shaft:
   p. the cylinder piston affixed to the lower end of the cylinder shaft;
   q. the cylinder piston inserted into the hollow cylinder comprising the main shaft stem;
   r. a set screw orifice to accept a set screw from the lock collar cylinder stop to prevent the cylinder shaft from pulling out of the cylinder;
   s. a mounting bolt inserted through the upper end of the handle bar slide mount and the progressive spring into the upper end of the cylinder shaft;
   t. a steering bracket attachment means around the circumference of the lower end of the main shaft stem;
   u. a handlebar mount assembly means attached to the upper portion of the center steering assembly;
   v. the center steering assembly having the handlebar mount assembly attached to the upper end of the center steering assembly at the cylinder shaft mount orifice;
   w. the main shaft stem attached by a strong, secure attachment at to the frame of the vehicle;
   x. the steering means of the vehicle attached at the point of insertion of the mounting hardware nut by an attachment means.

6. The machine for a floating handlebar system in claim 5 wherein a gas or combination of gases is used in place of hydraulic fluid.

7. The machine for a floating handlebar system in claim 5 wherein a spring is used in place of hydraulic fluid.

8. The machine for a floating handlebar system in claim 5 further wherein a progressive spring is used in place of hydraulic fluid.

9. The machine for a floating handlebar system in claim 5 wherein a steering bracket support gusset is attached to one side of the vertical longitudinal axis of the main shaft stem.

10. The machine for a floating handlebar system in claim 5 wherein the steering bracket attachment means has a steering rod mount bushing on each side to attach to the steering arms of the vehicle the machine is installed upon.

11. The machine for a floating handlebar system in claim 5 wherein a recoil boot cover means covers the area where the handlebar slide mount and the cylinder interface.

12. The machine for a floating handlebar system in claim 5 wherein a spline on the vertical surface of the cylinder shaft nests into a notch in the center steering assembly at the cylinder shaft mount orifice.

13. The machine for a floating handlebar system in claim 5 wherein a hydraulic dampening mechanism is used in place of a spring inside the handlebar mount support plate.

14. The machine for a floating handlebar system in claim 5 further comprising a non-metallic spring means is used in place of a metallic spring.

15. The machine for a floating handlebar system in claim 5 wherein piston rubber seals are affixed to the circumference of the top and the bottom of the cylinder piston.

16. The machine for a floating handlebar system in claim 5 wherein a flexible "O" ring seal is affixed to the outer circumference of the lock collar cylinder stop.

17. The machine for a floating handlebar system in claim 5 wherein a lubrication inlet is located on the handlebar slide mount.

18. The machine for a floating handlebar system in claim 5 wherein a mounting bolt is inserted into a mounting washer before entering the cylinder shaft.

19. The machine for a floating handlebar system in claim 5 wherein mounting spacers are inserted at the top and bottom of each side of the handlebar mount assembly means between the left short arm and the right short arm, and mounting washers are inserted between the left mounting nut and the right mounting nut, and between the left mounting spacer and the right mounting spacer.

20. A machine for a floating handlebar system comprising:
   a. a center steering assembly comprised of a handlebar slide mount;
   b. a lower handlebar mount support plate;
   c. the lower handlebar mount support plate surrounding and affixed to the lower circumference of the handle bar slide mount;
   d. an upper handlebar mount support plate;
   e. the upper handlebar mount support plate affixed around the upper circumference of the handle bar slide mount;
   f. a main shaft stem;
   g. a hollow cylinder inside the main shaft stem;
   h. hydraulic fluid inside the cylinder;
   i. a fluid discharge reservoir means;
   j. the fluid discharge reservoir connected to the hydraulic fluid in the cylinder by a small diameter orifice;
   k. a spring inserted inside the handlebar mount support plate;
   l. a cylinder shaft mount orifice in the center of the handlebar mount assembly;
   m. a lock collar cylinder stop seated onto the upper end of a cylinder shaft;
   n. a cylinder piston;
   o. a cylinder shaft:
   p. the cylinder piston affixed to the lower end of the cylinder shaft;
   q. the cylinder piston inserted into the hollow cylinder comprising the main shaft stem;
   r. a set screw orifice to accept a set screw from the lock collar cylinder stop to prevent the cylinder shaft from pulling out of the cylinder;
   s. a mounting bolt inserted through the upper end of the handle bar slide mount and the progressive spring into the upper end of the cylinder shaft;
   t. a steering bracket around the circumference of the lower end of the main shaft stem;
   u. a mounting hardware nut inserted into the lower end of the narrowed shaft mounting surface of the main shaft stem;
   v. a handlebar mount assembly attached to the upper portion of the center steering assembly;
   w. the handlebar mount assembly comprised of a hollow left short arm to the left of the main shaft stem supported by the lower handle bar mount support plate near the bottom and the upper handle bar mount support plate near the top;
   x. a left mounting bolt inserted through a left handle bar mounting orifice, a left top handle bar clamp and a bottom handle bar clamp and then into the upper end of the hollow left short arm;
   y. the left mounting bolt anchored at the bottom of the left short arm by a left mounting nut;
   z. a hollow right short arm to the right of the main shaft stem supported by the lower handle bar mount support plate;
   aa. a right mounting bolt inserted into the upper end of the hollow left short arm;
   bb. the right mounting bolt inserted through right handle bar mounting orifice, a right top handle bar clamp and a right bottom handle bar clamp and then into the upper end of the hollow right short arm;
   cc. a right short arm to the right of the main shaft stem supported by the upper handle bar mount support;
   dd. the center steering assembly having the handlebar mount assembly attached to the upper end of the center steering assembly at the cylinder shaft mount orifice;
   ee. the main shaft stem attached by a strong, secure attachment at to the frame of the vehicle;
   ff. a handlebar means inserted between the left top handle bar clamp and left bottom handle bar clamp on the left and the right top handlebar clamp and the right bottom handlebar clamp;
   gg. a mounting hardware nut and washer means (39) at the base of the main shaft stem; and
   hh. the steering means of the vehicle attached at the point of insertion of the mounting hardware nut by an attachment means.

\* \* \* \* \*